United States Patent
Kammerer et al.

(10) Patent No.: US 10,440,155 B2
(45) Date of Patent: Oct. 8, 2019

(54) PRIVATE CONNECTION MULTI-MEDIA TRANSITION

(71) Applicant: Cloud9 Technologies, LLC, New York, NY (US)

(72) Inventors: Stephen J Kammerer, Peekskill, NY (US); Leonidas P Papadopoulos, Ridgefield, CT (US); Andrew Pappas, Hicksville, NY (US)

(73) Assignee: Cloud9 Technologies, LLC, New York, NY (US)

( * ) Notice: Subject to any disclaimer, the term of this patent is extended or adjusted under 35 U.S.C. 154(b) by 46 days.

(21) Appl. No.: 15/346,851

(22) Filed: Nov. 9, 2016

(65) Prior Publication Data
US 2017/0201391 A1    Jul. 13, 2017

Related U.S. Application Data

(60) Provisional application No. 62/277,461, filed on Jan. 11, 2016.

(51) Int. Cl.
*H04L 29/06*    (2006.01)

(52) U.S. Cl.
CPC .......... *H04L 67/42* (2013.01); *H04L 65/1006* (2013.01); *H04L 65/1069* (2013.01)

(58) Field of Classification Search
CPC .............. H04L 12/4641; H04L 65/1006; H04L 65/1069; H04L 67/42; H04L 67/14; H04L 67/141; H04L 67/148; H04L 65/1083; H04L 65/1086; H04L 65/1089; H04L 65/1093; H04L 65/4015; H04L 65/4023; H04L 47/76; H04L 12/1827; H04L 65/4007; H04L 51/00; H04L 51/36; H04L 51/046; H04L 69/14; H04L 65/403; H04L 12/1813; H04L 65/1053; H04L 65/1056; H04L 65/1059; H04L 29/06; H04L 41/00; H04L 41/22; H04L 65/1003; H04L 65/1096; H04M 7/0024; H04M 3/56; H04M 3/42314; H04M 7/009; H04M 3/42221; H04M 7/0012; H04M 7/0084; H04M 9/00; H04M 9/003; H04W 36/0011; H04W 4/08; H04W 4/16; H04W 92/18; G06F 3/0484; G06F 3/04842; G06F 3/04847

See application file for complete search history.

(56) References Cited

U.S. PATENT DOCUMENTS

| | | | |
|---|---|---|---|
| 6,816,587 B1 * | 11/2004 | Orui .................. | H04M 3/4228 379/221.15 |
| 7,035,386 B1 * | 4/2006 | Susen ................ | H04M 3/2281 379/114.14 |
| 7,111,044 B2 * | 9/2006 | Lee ................... | H04L 12/1827 709/204 |

(Continued)

OTHER PUBLICATIONS https://datatracker.ietf.org/doc/draft-beauchamp-private-wire/.
http://datatracker.ietf.org/doc/rfc3261/?include_text=1.
http://en.wikipedia.org/wiki/Key_telephone_system#Key_system.

*Primary Examiner* — Greg C Bengzon

(57) ABSTRACT

Systems and methods are provided for setting up a communication channel over a packet switched network between/among participants to a private line connection which has been established over the packet switched network such that the communication channel is different from the private line connection.

18 Claims, 15 Drawing Sheets

(56) References Cited

U.S. PATENT DOCUMENTS

| | | | | |
|---|---|---|---|---|
| 7,860,071 B2* | 12/2010 | Hinrikus | ............ | H04L 12/5692 370/338 |
| 8,224,366 B2* | 7/2012 | Reich | ............ | H04W 4/10 455/517 |
| 8,599,834 B2* | 12/2013 | Potts | ............ | H04L 65/1006 370/352 |
| 8,605,878 B2* | 12/2013 | Claudatos | ............ | H04M 3/38 379/198 |
| 8,627,211 B2* | 1/2014 | Kropivny | ............ | H04L 12/1827 715/754 |
| 9,178,773 B1* | 11/2015 | Tassone | ............ | G06F 3/0481 |
| 9,246,878 B2* | 1/2016 | Kumar | ............ | H04L 63/0272 |
| 9,306,870 B1* | 4/2016 | Klein | ............ | H04L 29/06176 |
| 9,450,901 B1* | 9/2016 | Smullen | ............ | H04L 51/046 |
| 9,532,197 B1* | 12/2016 | Lew | ............ | H04W 12/001 |
| 10,193,864 B2* | 1/2019 | Toy | ............ | H04L 67/1097 |
| 2002/0161667 A1* | 10/2002 | Felkey | ............ | G06Q 10/087 705/26.41 |
| 2003/0028650 A1* | 2/2003 | Chen | ............ | H04L 12/4641 709/229 |
| 2003/0058806 A1* | 3/2003 | Meyerson | ............ | H04L 51/36 370/260 |
| 2003/0058844 A1* | 3/2003 | Sojka | ............ | H04M 1/72527 370/352 |
| 2003/0059021 A1* | 3/2003 | Meyerson | ............ | H04L 51/36 379/219 |
| 2004/0004942 A1* | 1/2004 | Nebiker | ............ | H04M 1/2473 370/260 |
| 2004/0034723 A1* | 2/2004 | Giroti | ............ | H04L 12/1822 710/8 |
| 2004/0062264 A1* | 4/2004 | Adams | ............ | H04L 51/36 370/432 |
| 2004/0068648 A1* | 4/2004 | Lewis | ............ | H04L 51/36 713/153 |
| 2004/0076157 A1* | 4/2004 | Sojka | ............ | H04L 51/36 370/389 |
| 2005/0276405 A1* | 12/2005 | Fernandes | ............ | H04M 3/56 379/202.01 |
| 2006/0133582 A1* | 6/2006 | McCulloch | ............ | H04L 12/1895 379/45 |
| 2006/0147009 A1* | 7/2006 | Greenlee | ............ | H04L 29/06027 379/202.01 |
| 2007/0156811 A1* | 7/2007 | Jain | ............ | H04L 12/1827 709/204 |
| 2007/0218885 A1* | 9/2007 | Pfleging | ............ | H04M 3/56 455/416 |
| 2007/0239885 A1* | 10/2007 | Vadlakonda | ............ | H04L 12/1827 709/232 |
| 2008/0175230 A1* | 7/2008 | Brand | ............ | H04L 65/1053 370/352 |
| 2009/0083374 A1* | 3/2009 | Saint Clair | ............ | G05B 15/00 709/203 |
| 2009/0304168 A1* | 12/2009 | Bakshi | ............ | H04L 12/66 379/165 |
| 2010/0295671 A1* | 11/2010 | Sweeney | ............ | G08B 17/00 340/533 |
| 2010/0312899 A1* | 12/2010 | Herzog | ............ | H04L 67/141 709/228 |
| 2011/0075653 A1* | 3/2011 | Potts | ............ | H04L 65/1006 370/352 |
| 2011/0179180 A1* | 7/2011 | Schleifer | ............ | H04L 12/1818 709/227 |
| 2011/0270921 A1* | 11/2011 | Jones | ............ | G06F 3/0421 709/204 |
| 2012/0151060 A1* | 6/2012 | Dawson | ............ | H04L 65/4015 709/225 |
| 2012/0268553 A1* | 10/2012 | Talukder | ............ | H04L 12/1818 348/14.08 |
| 2013/0167042 A1* | 6/2013 | Smith | ............ | G06Q 10/10 715/753 |
| 2013/0198288 A1* | 8/2013 | Jones | ............ | H04L 12/1831 709/204 |
| 2013/0342635 A1* | 12/2013 | Yurchenko | ............ | H04L 12/1818 348/14.08 |
| 2014/0095604 A1* | 4/2014 | Bank | ............ | H04L 65/403 709/204 |
| 2014/0241340 A1* | 8/2014 | Seligmann | ............ | H04M 9/003 370/352 |
| 2015/0111553 A1* | 4/2015 | Efrati | ............ | H04L 12/1818 455/416 |
| 2015/0188956 A1* | 7/2015 | Chauhan | ............ | G06Q 30/016 726/7 |
| 2016/0021038 A1* | 1/2016 | Woo | ............ | H04L 51/046 709/206 |
| 2016/0021039 A1* | 1/2016 | Woo | ............ | H04L 51/046 715/752 |
| 2016/0134666 A1* | 5/2016 | Ethier | ............ | H04L 65/403 709/204 |
| 2016/0255126 A1* | 9/2016 | Sarris | ............ | H04L 65/1096 348/14.08 |
| 2016/0284031 A1* | 9/2016 | Quon | ............ | H04W 4/21 |
| 2017/0093936 A1* | 3/2017 | Lau | ............ | H04L 65/403 |
| 2017/0104959 A1* | 4/2017 | Bracken | ............ | H04N 7/147 |
| 2017/0201391 A1* | 7/2017 | Kammerer | ............ | H04L 12/4641 |
| 2017/0238152 A1* | 8/2017 | Patel | ............ | H04W 4/10 370/312 |
| 2017/0295475 A1* | 10/2017 | Patel | ............ | H04W 4/10 |
| 2018/0006978 A1* | 1/2018 | Smullen | ............ | H04L 51/046 |
| 2019/0007555 A1* | 1/2019 | Newman | ............ | H04M 3/56 |

* cited by examiner

MRD private line between two parties.

Shout down private line between two parties.

Hoot & Holler Circuit connection between multiple parties.

ARD Private line between two parties.

SIP signaling trapezoid.

Anatomy of a private line circuit.

Termination of private line service to customer location.

Cross connect wiring between telecom services customer demarc and telephone system.

Typical PBX call routing functionality.

Termination and display of private lines on key telephone system.

PRIVATE CONNECTION MULTI-MEDIA TRANSITION

CROSS REFERENCE TO RELATED APPLICATIONS

This application claims the benefit of the filing date of U.S. provisional patent application No. 62/277,461, "Private Connection Multi-Media Transition", which was filed on Jan. 11, 2016, by the same patentee of this application and which shares the same inventor as this application. That provisional application is hereby incorporated by reference as if fully set forth herein.

FIELD OF THE TECHNOLOGY

The disclosed technology relates generally to network based voice communications, and more specifically but not exclusively to creating a new connection between a subset of parties to a private voice line.

BACKGROUND OF THE TECHNOLOGY

Private lines are typically point-to-point communication channels provided by telecommunications (Telecom) carriers. Telecom carriers provision a fixed route on their network that creates a pre-defined point A to a point B communication channel. Unlike with Public Switched Telephone Network (PSTN) services, the telecom carrier of a digital network reserves network bandwidth to ensure the private line is non-blocking. The term non-blocking means service is always available and not affected by other network traffic. This differs from a standard PSTN dial tone line wherein the carrier receives dialed digits from the calling party, then routes the connection based on a dial plan, as a standard PSTN dial tone line has the potential for blocking during peak calling periods.

One of the primary forms of voice communications in the financial trading industry is a direct private telephone line. These private lines are often referred to as ring down circuits within the global financial trading community.

Types of Private Lines: Telecom carriers offer private line service in analog, digital time division multiplexing (TDM) and voice over internet protocol (VoIP) formats. However, the analog format was where the behavior and functionality of private lines was first defined and thus forms the basis for modernized digital TDM and VoIP service delivery by carriers.

Manual Ring Down (MRD) Lines: The term manual ring down refers to a specific type of signaling format and type of private line. This circuit type of private line lacks off-hook/on-hook signaling or talk battery from the telephone company. Historically, MRD's were provisioned by carriers by physically running copper wires from location A to location B or more commonly leasing these copper wire facilities from a local telecom access provider. Proper termination of MRD private line signaling on customer premises telephone equipment requires each of the two end points to be responsible for providing talk battery for their own phones and ring generators to ring the far end. In the United Kingdom these lines are also known as "gen-gen" representing the fact that there is a user provided customer premises equipment ("CPE") ring generator on both sides of the telephone line.

In trading applications, these types of lines are typically used when one end or both ends of the line will be presented on a speaker that is always live. If the speaker is ever turned off or if the line is on a handset the other end will send ring voltage via a ring generator to ring the speaker that may be turned off or the handset that may be on hook.

This phone line is called "manual" ring down because the telephone set provides the user with the ability to send ringtone to the far end. A signal button is pressed whenever the user needs to ring the far end. FIG. 1 provides an overview of conventional MRD signaling.

A significant characteristic of MRD lines is that there is no line state. There is no way to know if either user is on-hook or off-hook other than by listening to hear if sound is being produced at the other end. This can result in one end ringing the other end even if the phone is already off-hook. This concept of "lack of line state" will be discussed below with respect to MRD emulation using SIP (Session Initiation Protocol).

Shout down lines: Shout down lines are identical to MRD lines in every way except that the CPE does not offer a ring generator for distant end signaling. These private lines are typically used between two parties engaged in shout-down communications that are always on. The advantage of shout-down lines is that connection is always engaged so each party can instantly communicate with the other without any physical interaction (similar to being in the same room with someone). FIG. 2 provides an overview of a conventional shout down connection between two parties. As shout down private lines are actually a version of MRD circuits, they share the common characteristic that there is no line state.

Hoot & Holler Lines: The previous MRD and shout down private line description is most commonly used for two-party point A to point B communications scenarios. Hoot & Holler lines were invented to support situations where more than two communicating party locations are required. In other words, three or more parties communicating in an open, always available conference call. Unlike point-to-point analog private lines that are traditionally delivered by the telecom carriers in a two-wire format similar to analog PSTN (dial tone) circuits, Hoot & Holler lines require separation of transmit/receive paths and therefore are delivered using a 4-wire circuit connection. Separating transmit and receive channels helps to prevent acoustic feedback and allows the use of separate transmit/receive ("TX/RX") amplifiers to support an unlimited number of end point circuit terminations. Two wires are used for transmitting voice and two wires are used to monitor activity from any far end party. Another often used term for hoot & holler lines are junkyard circuits. Junkyard circuits use hoot & holler service to broadcast to other connected junkyards. The circuit is often times used to trade auto parts. FIG. 3 provides an overview of a conventional Hoot & Holler circuit. Similar to MRD and shout down private lines, hoot & holler circuits have no defined line state.

Automatic Ring down Lines (ARD): ARD circuits were developed to allow plain old telephone sets (POTS) and office telephone systems to access carrier private line services. The service provider supplies talk battery and ring generator. By design, ARD private lines have similar electrical characteristics as standard analog PSTN dial tone circuits. A distinction between ARD private lines and dial tone circuits is that the carrier does not offer dial tone on ARD private lines. Because ARD circuits are intended for point A to point B communications, dialing is not required. Simply the act of going "off-hook" is sensed by the private line provider. The private line provider then automatically rings the distant end, which is set when the private line is provisioned. FIG. 4 provides an overview of conventional ARD signaling. ARD circuits have defined line states.

Detection of DC current flow on the two wire circuit allows the carrier to determine the on-hook or off-hook state of each termination point.

Private Line Automatic Ring down (PLAR): With one exception, PLAR lines are identical to ARD lines. PLAR circuits have an additional line supervision feature. Line supervision monitors the state of each end point of the private line and signals the distant end when the state of the local side changes. For example, when side-A hangs up the private line the network carrier signals side-B of this off-hook to on-hook state change. This signal is commonly referred to as a 'wink' and is transmitted by temporarily reversing voltage polarity on the wire pair or by temporarily interrupting the talk battery supply on the circuit. This additional supervision feature allows customer provided telephone systems to offer users more detail about the state of the private circuit connection.

Evolution of Digital Private Lines: During the 1990s telecom carriers introduced digital TDM service delivery. This offered carriers a way to expand the type and density of services that could be delivered to potential customers without having to upgrade the local access copper infrastructure into buildings. As digital trunks became available, a method of supporting private line functionality was also required over these digital transports. In the United States T1 digital trunks were used which relied on channel associated signaling (CAS). In Europe E1 digital trunks were deployed and also relied on CAS for signaling. The difference between T1 & E1 is not relevant to this discussion.

CAS represents a set of transmit and receive signaling bits per channel. Each TDM (multiplexed) channel is a voice circuit or the digital equivalent of an analog line. The result is a digital E1/T1 trunk that supports multiple communication circuits with signaling bits that determine the type of service delivered in each channel. The signaling bits are used to send and receive signaling actions to and from the distant end and service provider. The signaling format emulates the same signaling actions that are present on the analog circuits described previously in this background.

MRD emulation of digital E1/T1 trunks
Transmit signaling bits are used to send ring signal to the distant end.
Receive signaling bits are used to receive ring signal from the distant end.
Unlike ARD & PLAR the carrier simply passes through the signaling bits and is not involved in signaling.
Shout down and Hoot & Holler Circuits emulation of digital E1/T1 trunks
Transmit signaling bits are static meaning that they don't change because no ringing or battery is ever signaled to the far end.
Receive signaling bits are static meaning that they don't change because no ringing or battery is ever sent from the far end.
Unlike ARD & PLAR the carrier simply passes through the signaling bits and is not involved in signaling.
ARD & PLAR emulation on digital E1/T1 trunks:
Perspective of the private line phone:
Signaling bits are transmitted to indicate the following:
The phone is off hook and drawing loop current from the private line provider.
Signaling bits are received and indicate the following:
A ring signal is being received from the private line provider.
A polarity reversal indicating that the far end went on hook. (PLAR only)
A loop current disconnect (battery disconnect) indicating that the far end went on hook. (PLAR only)
Perspective of the private line provider:
Signaling bits are transmitted to indicate the following:
A ring signal is being sent to the private line phone.
A polarity reversal indicating to the private line phone that the far end it was communicating with went on hook. (PLAR only)
A loop current disconnect (battery disconnect) indicating to the private line phone that the far end it was communicating with that the far end went on hook. (PLAR only)
Signaling bits are received to indicate the following:
Loop current (talk battery) is being drawn by the private line phone indicating that it is off hook.

Evolution of private lines using VoIP Protocols: SIP is predominantly the VoIP protocol that is relevant to the disclosed technology. The next most popular VoIP protocol was H.323. H.323 and other VoIP protocols have been used for standard PSTN (dial tone) services but not for private lines. These VoIP protocols still exist today, but since 2014 SIP has been the predominant VoIP protocol for private line service delivery.

SIP Sessions for stateless private lines: SIP is a session protocol and assumes a session is set up between two endpoints. As noted previously; MRD, shout down, and hoot& holler circuits do not support an on-hook or off-hoot state. These lines do not have a state because they are always connected from the perspective of the provider. Therefore, these types of lines do not establish a session between each other. Thus SIP does not natively support these line types. The contradiction is that SIP is a session protocol that cannot adequately emulate an analog private line service that has no discernable state. This has led to customized implementations which are described in U.S. Pat. No. 8,599,834 and https://datatracker.ietf.org/doc/draft-beauchamp-private-wire/. These custom implementations mean that both ends of the line must implement the specific custom implementation in order to be compatible.

SIP Sessions for stateful private lines: PLAR and ARD have an on/off hook state and therefore can be emulated through the SIP protocol.

SIP Sessions and Signaling Paths: Analog and digital lines signal directly from one termination to another. In contrast SIP often uses SIP proxies. This is described in, among other places, http://datatracker.ietf.org/doc/rfc3261/?include_text=1. This signaling structure is sometimes referred to as the SIP trapezoid and is illustrated in FIG. 5. Modern phone systems terminate SIP on the phone system and not directly to the end user telephone connected to the phone system.

Private line service use in industry: Private lines are used in many industries. Examples are: financial trading, public safety, command and control applications, enterprise help desks, power industry communication, and more. While the description in this application will focus on the trading industry the technology is applicable to these other industries as well.

Financial Trading Industry: Private lines provide traders with a one to one connection between two firms. However, firms involved in trading need to connect with many counterparties. Therefore, traders typically require multiple private lines. Trading floors designed prior to 1970 required many telephones to be installed at each trading desk.

The turret system, also known as dealerboard system, was designed to connect a single phone to multiple private lines and allow users to access these connections through a single multi-button telephone. The turret is a specialized key telephone (http://en.wikipedia.org/wiki/Key_telephone_system#Key_system). Starting in the 1970s providers of these systems were AT&T Comcore, V-Band Systems, Tech Turret, IPC Systems, City Business Products (CBP)/British Telecom. Modern turret providers are IPC, BT-Syntegra, Orange Business Systems/Etrali, Speakerbus, IP-Trade, and a few others.

With the advent of the turret system, traders could trade as a collaborative team. These lines were no longer connections between two individuals but between teams of people at different firms. Private lines were terminated on line cards that offered many traders at a firm common access to services. Therefore, a calling party calls to a firm, without knowing who at the firm will answer. However, the service is improved because of the increased likelihood of an available trader to answer the call on the private line.

Limitations of existing technology: Private voice circuits are considered specialized services by telecom carriers and many carriers no longer offer these services. Today, the niche private line market is maintained by small specialized telecom companies that focus on financial trading services, and are often trading system (turret) providers as well. Unlike many other modern telecommunications services, existing private voice circuits have several undesirable elements:

Long provisioning timeframes
Expensive
Long commitment periods
IT staff involvement is required during provisioning and installation Network anatomy of a private line circuit: Connecting two firms with a single private line is a complex logistical process. There are three network components to be considered when a single private line is provisioned between two trading floor locations.

1. Local loop circuit from central office to trading location A.
2. Inter-exchange bandwidth across telecom carrier network.
3. Local loop circuit from central office to trading location B.

FIG. 6. illustrates the three network components that are required to provision a conventional point to point private line connection. Depending on the locations of the two end points of a private line, it can be necessary to use multiple network service providers to obtain the required connections between local circuits ("last mile") and interexchange bandwidth ("long haul"). The coordination between telecom providers is often left to the customer, or to one of the local telecom providers if private voice circuits are a standard service offering.

Delivery of Private Line from the Carrier to the Customer Demarcation Point: Typically, telecom carriers deliver their services to customer premises over copper or fiber cabling systems. Tier 1 local access providers own and manage this infrastructure, while other service providers lease these building access facilities. In either case, the telecom service provider must install and manage their own service access points within a customer facility. This point is often referred to as the telecom demarcation or "demarc". The telecom demarc is the wiring facility and connection point where customer provided equipment is interfaced to telecom carrier services. FIG. 7 provides a diagram that explains the interface between the network carrier demarcation point and customer premises interfaces.

Like traditional PSTN services, private line circuits are terminated on the service provider's demarc. The demarc includes wiring blocks with clear identification of all services by circuit ID. When delivered in an analog format, each private line is terminated on the demarc wiring block as a single pair of copper wires. This pair is often referred to as a "tip and ring" circuit. When the telecom provider delivers digital private line service the demarc requires two copper wire pairs that multiplex (TDM) many private lines together. This circuit is often referred to as a four wire TDM circuit. In the United States the telecom standard is to multiplex 24 circuits into a single TDM T1 circuit. In most other countries, a slightly different standard is used where 30 circuits are multiplexed into a single TDM E1 circuit.

Delivery from Customer Demarcation Point to the Customer Phone System: Once private line circuits are terminated onto the service provider's demarc they need to be interfaced to the customer's telephone system. Traditionally, the customer is responsible for the wiring of services from the Telco demarc to their own equipment. Copper wiring between Telco demarc and customer telephone system is often referred to as cross connect wiring. FIG. 8 illustrates the cross connect wiring requirements for analog, digital and VoIP private lines to be connected between network carrier and customer provided telephone system.

Financial trading firms often have hundreds of private line circuits that they use for communicating with counterparties. Therefore, they must maintain large wiring frames for cross connecting telecom services onto their telephone systems. The migration of private line services from analog to digital occurred during the 1990s. While analog services are still supported, most private line service providers and trading firms prefer digital service delivery because it simplifies the wiring, testing and management of private line services.

The customer is responsible for purchasing and equipping their telephone systems with the proper interface cards that will be compatible with the services offered by the Telco provider at the demarc. Most modern telephone systems that support private line service can be equipped with analog line interface cards for analog services and digital line interface cards for digital services.

When analog services are provided, each private line requires the customer to cross connect a pair of copper wires between the carrier's Telco block and analog line interface card. If digital services are offered the customer must cross connect four copper wires to a corresponding digital interface card.

Programming of telephone system to provision lines onto line interfaces: Once a private line has been connected via cross connects to the telephone system, the customer is responsible for programming the system to accept the service and to test whether the circuit is operating properly. Along with making sure the proper interface card is connected to the telecom provider's private line service, programming is required to make sure proper telecom signaling is assigned. While beyond the scope of this document, interface settings (i.e. circuit type assignment, bit signaling, voice and data channel assignments) must be properly programmed for each private line circuit connected on the telephone system before new service can be ready for testing.

Programming of telephone system to provision lines to buttons on users' phones: A private line circuit is uniquely designed to provide a dedicated voice channel between two locations. Each location can contain many individuals that need equal and often simultaneous access to the private circuit for the purpose of communicating with counterparties (other firm) and each other (same firm). Therefore, the termination and presentation of private circuits on the customer premises telephone system is also unique.

Typically, customer premises telephone systems are designed as private branching exchanges (PBX) that allow local users to access circuits in an unshared and contentious format. Users can access terminated telecom circuits, but normally do not share them at the same time. For incoming calls, PBX systems route circuits to individuals' extensions. For outgoing calling the PBX system allows users to contend for available outgoing circuits using dial access codes. FIG. 9 provides an overview of generic PBX system call routing features.

Using a branching exchange system to interface to private lines tends to defeat the purposeful design of the connection to provide shared simultaneous communications between users at each location. A key system design is a better telephone system to terminate and offer private lines to users.

A key system allows private lines to be displayed as dedicated line buttons or "line keys" at each user's telephone instrument at all times. The key system interface is designed to provide two important telephony features for private line functionality:
Continuously display line status indications for each terminated private line (ring, idle, busy) at each user's telephone.
Provide users with equal and simultaneous access to all private line terminations via dedicated buttons.

No call branching (routing) is utilized by a key system. Termination of the private line and advertisement of the circuit's state is typically displayed on dedicated line buttons at each user's telephone. Users are free to access the circuit for incoming or outgoing calling. Peers are free to join active calls by selecting the active button on their key telephone. FIG. 10 illustrates the interface and display of private line circuits as button appearances on key telephones.

Key telephone systems designed prior to 1980 used physical wiring to connect private lines to each user's key telephone. Modern key telephone systems use switching technology and software to assign telecom services connected on line interface cards to user key telephone devices (turret). While programming private line appearances to user key telephone buttons is no longer physically laborious, it can be a tedious process for IT personnel to manage. This is because trading floors can have hundreds of private lines with hundreds of user telephones that need to be properly assigned to meet each user's unique configuration. This programming step is usually performed by IT staff and not the individual users themselves.

Testing coordination between sites: The provision process is complex as has been shown on the carrier side, customer termination with two different customer sites, line interface termination on two customer sites, line interface programming on two customer sites, and button programming on two customer sites. The complex process involves many different people and is error prone. Therefore, the final required step in the provisioning process is end to end testing.

Testing new private line circuits is usually the responsibility of the customer that initially orders the service connection. The telecom service provider will test for connectivity back to their central office, but the customer is largely responsible for distant party circuit coordination and making test calls to confirm the private line is operational. This process is time consuming and requires tight coordination between customer, telecom service provider and distant end counterparty firm. The following are sequential steps that need to be successfully completed before a newly installed conventional private line can be used.

Distant counterparty approval of telecom service installation
Proper installation of private line circuit at customer site
Proper installation of private line circuit at distant counterparty site
Programming of private line service onto customer key telephone system
Programming of private line service onto user telephone line buttons
Programming of private line service onto counterparty key telephone system
Programming of private line service onto counterparty telephone line buttons
End to end calling on key telephones between customer and counterparty locations Currently, there are no automated test processes for private line service deployment. The end to end testing requires manual coordination and careful scheduling between telecom service providers, customer, IT personnel, users and the distant counterparty.

Cost and Logistics: Typical provisioning timeframes for private voice circuits can range from two weeks for intra-city connections to months when the locations are in different cities or even countries. During this period, the trading firms often cannot conduct business. While telecommunications technologies have advanced in the past 40 years from analog to digital TDM to Internet protocols, the provisioning process for private voice circuits has not been modernized.

Because of the logistical complexity and the need to reserve network carrier bandwidth, private voice circuits are costly and often require firms to commit to installation charges, monthly recurring charges and yearly commitments with strong penalties for early disconnect. The dilemma for these firms is that unless they have a long term need to conduct business with another firm it is often not practical for the firm to order private line service. Monthly charges for private voice circuits can range from $50(US) for intra-city connection up to $2,000(US) for inter-country connections. Major financial services firms often have several hundred private lines connecting a single trading location to other financial services firms that they have formal trading relationships with. Thus, this can become a very expensive proposition.

Even with such a great cost, over time, it is not unusual for a private line to be used infrequently. Sometimes it can happen because the user of the private line leaves the firm and takes the counterparty relationship with them, or possibly the user's need was based on a short-term business opportunity. Oddly, it can also be that the counterparty has changed their location and not notified the firm to order a circuit disconnect. In most cases firms do not monitor the activity of their private voice circuits, and users of private lines are not incentivized to notify IT managers if circuits are no longer required. The effect is unnecessary telecom costs creep higher over time as the inventory of private voice circuits are added and users request additional connections related to new business opportunities but do not disconnect old unused circuits.

Conventional private connections cannot be dynamically created. The connections are made between two firms with no way to know how many participants are listening on each end of each connection. The participant(s) on each end connection share the connection and there is no way for a subset of the group to transition to a separate connection for a side conversation both because the group members are not known and because another connection would need to be dynamically setup for the subset to speak on. Dynamic connections are not possible since traditional fixed connections are hard-wired connections that must be manually provisioned.

It would be advantageous to be able to discern the parties who are connected to a private connection. It would also be advantageous to dynamically create a separate connection for a subset of the parties connected to the private connection.

BRIEF SUMMARY OF THE TECHNOLOGY

Many advantages will be determined and are attained by one or more embodiments of the technology, which in a broad sense provides a system for creating new connections between a subset of groups located at remote locations who are connected via a private connection.

In one or more embodiments a method is provided which provides, between multiple users of a private line connection which has been configured over a packet switched network, an alternate communication channel. The method includes a processor based device identifying users who have selected the private line connection. The processor based device displays at least a partial list of the identified users on a display associated with the processor based device and receives a selection of one of the identified users from another of the users. The processor based device accesses the network address of the identified user and sets up an alternate communication channel between the identified user and the user who selected the identified user.

In one or more embodiments a method is provided which provides an alternate communication channel to a private line that is use. The method includes configuring with a server a virtual private line between multiple (at least two) clients via a packet switched network. Multiple users access the virtual private line via their respective computers. The server identifies and stores the network address for each computer that accesses the virtual private line. While the virtual private line is being accessed by the various computers, the server identifies addresses for a group of the computers and configures an alternate communication channel between the group. The group includes less than all of the computers that are connected to the virtual private line.

The invention will next be described in connection with certain illustrated embodiments and practices. However, it will be clear to those skilled in the art that various modifications, additions and subtractions can be made without departing from the spirit or scope of the claims.

BRIEF DESCRIPTION OF THE DRAWINGS

For a better understanding of the invention, reference is made to the following description, taken in conjunction with the accompanying drawings, in which like reference characters refer to like parts throughout, and in which.

Figure 1:
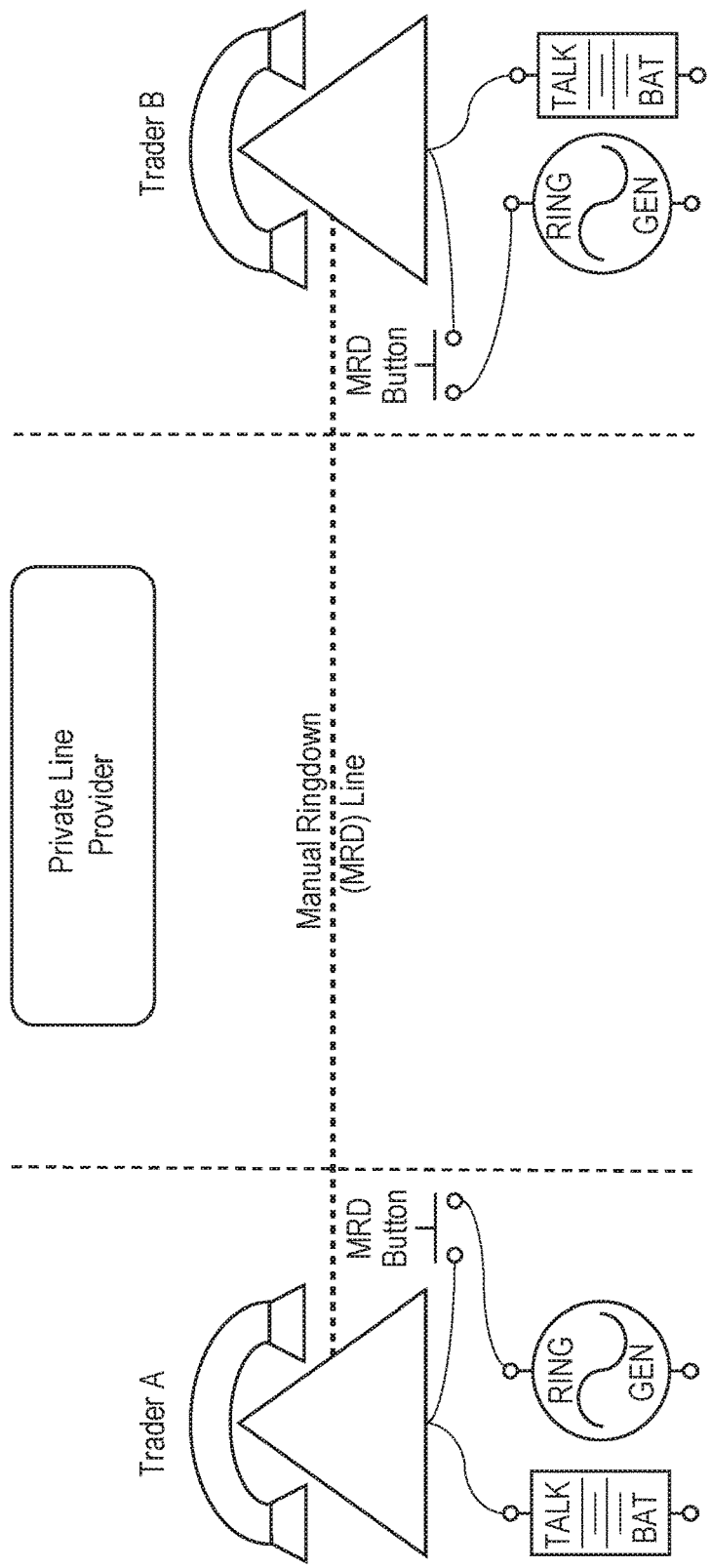
FIG. 1 illustrates an overview of MRD signaling.
Figure 2:
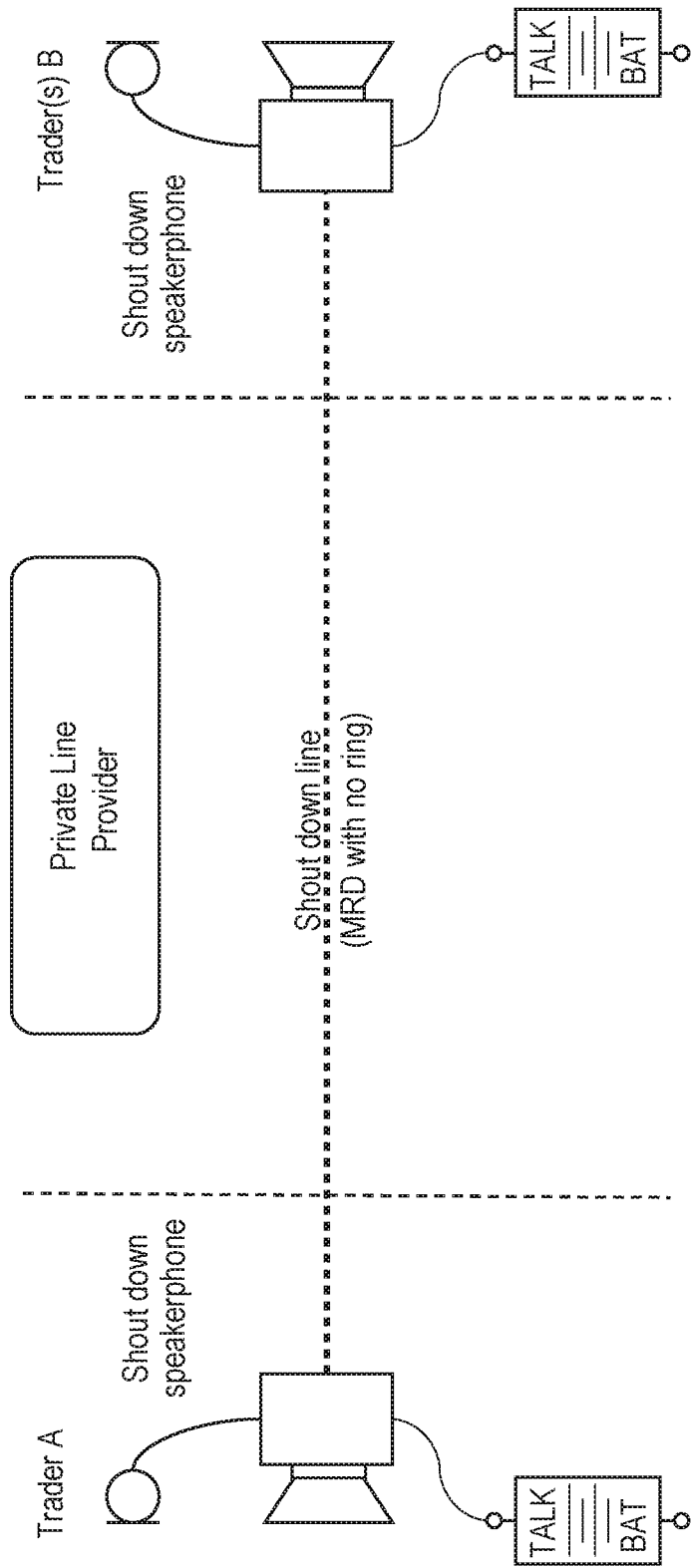
FIG. 2 illustrates an overview of shout down connection between two parties.
Figure 3:
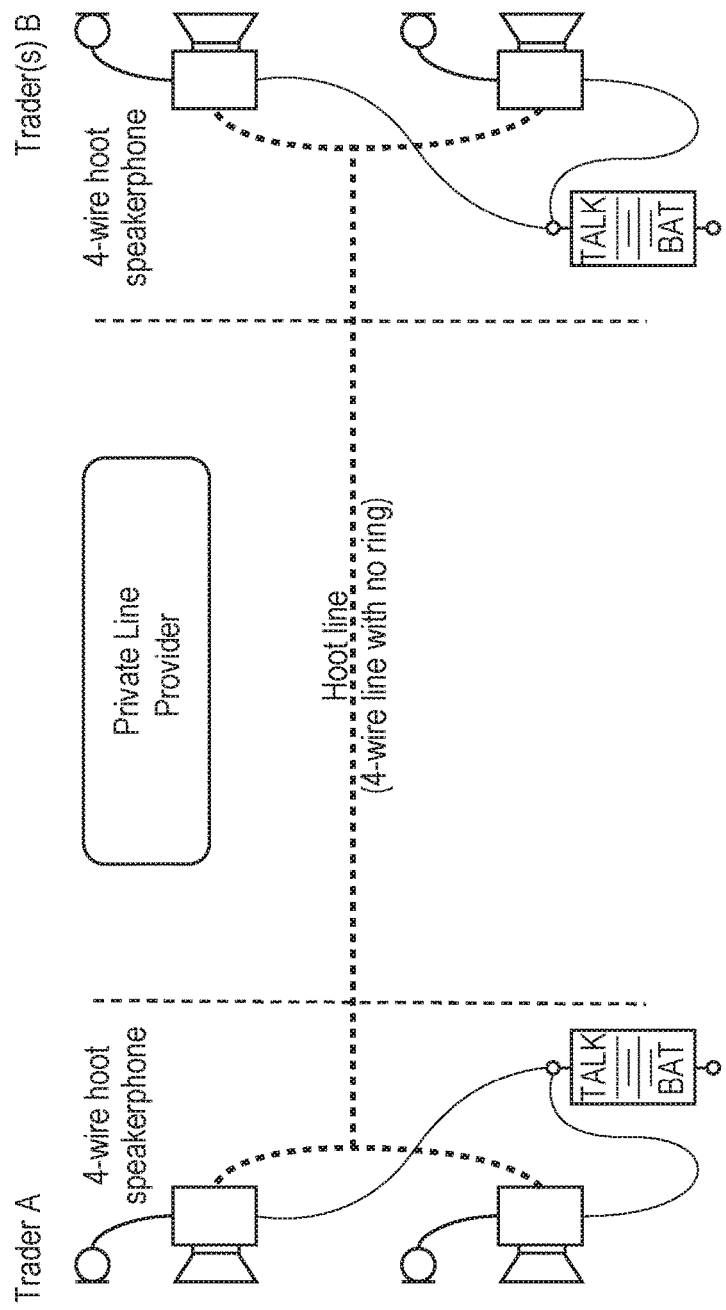
FIG. 3 illustrates an overview of Hoot & Holler circuit.
Figure 4:
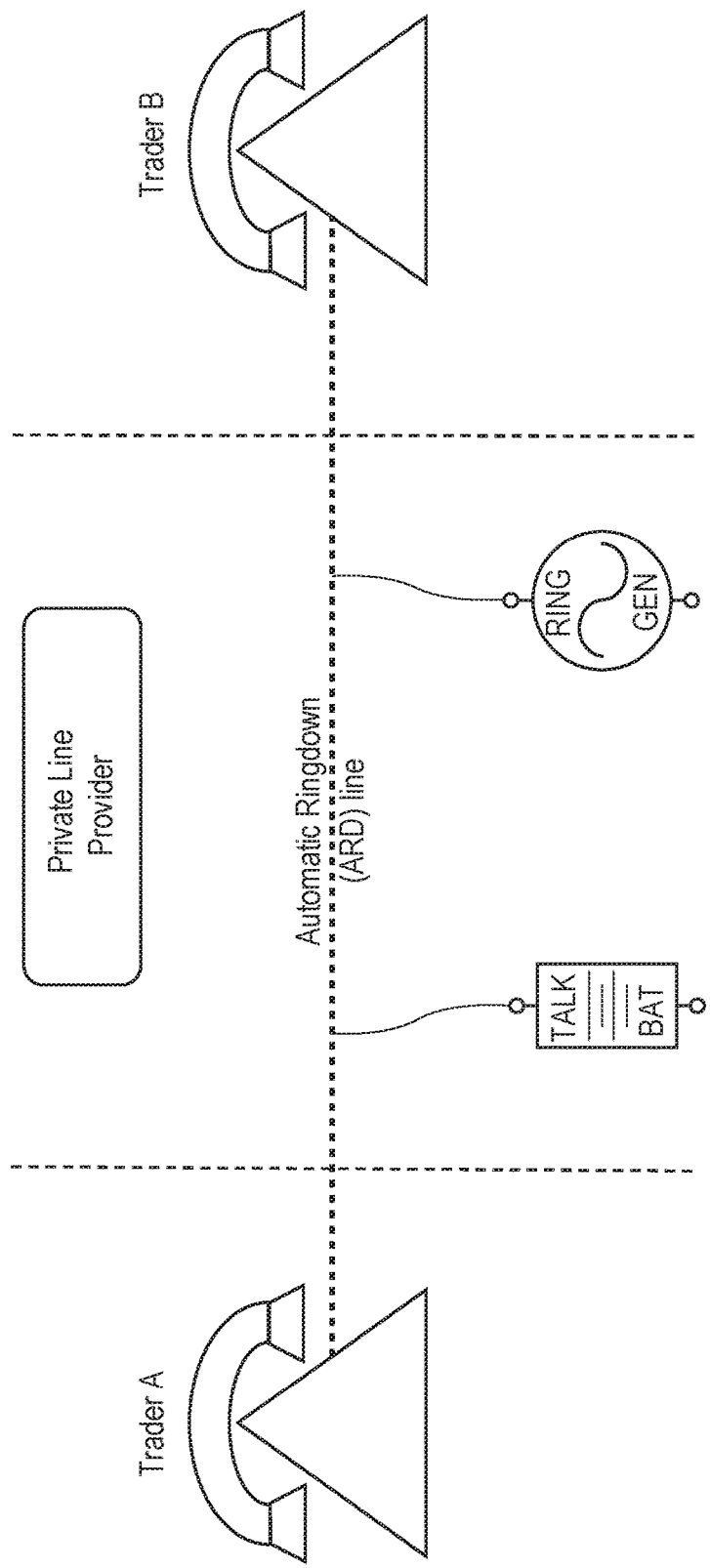
FIG. 4 illustrates an overview of ARD signaling.
Figure 5:
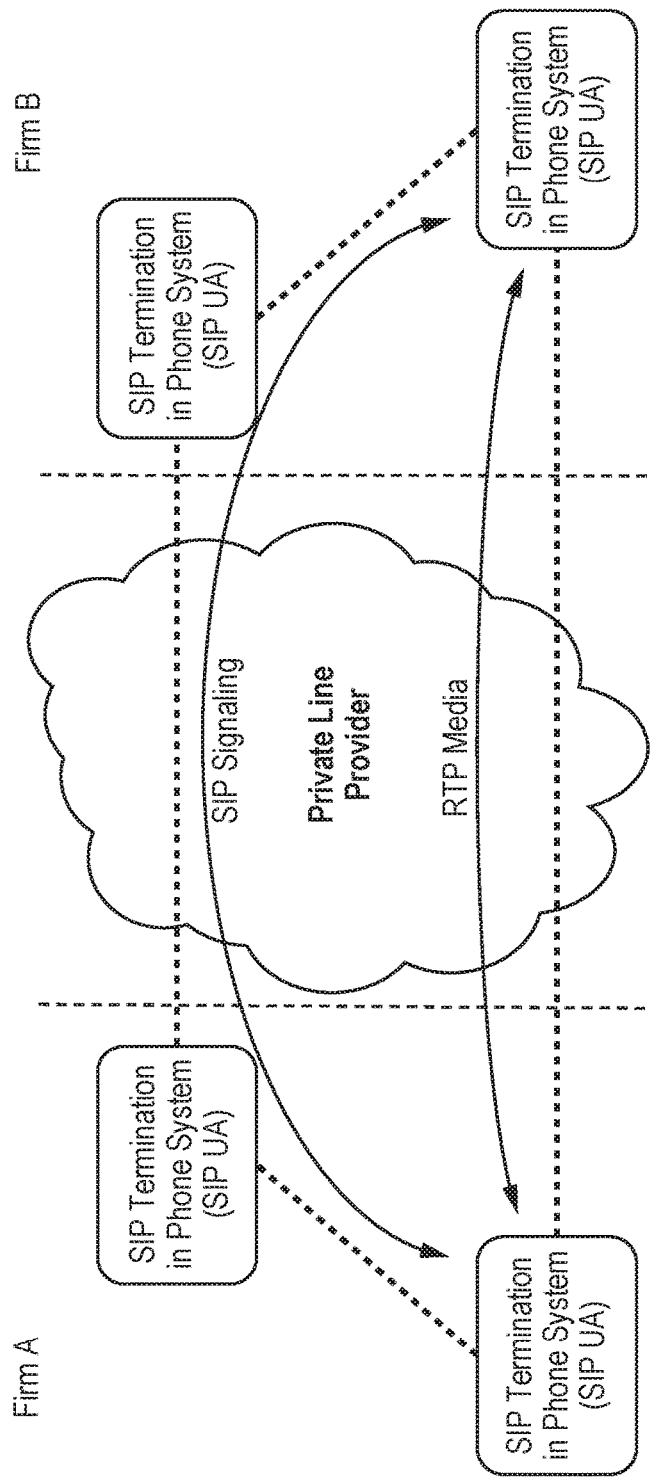
FIG. 5 illustrates the signaling structure sometimes referred to as the SIP trapezoid.
Figure 6:
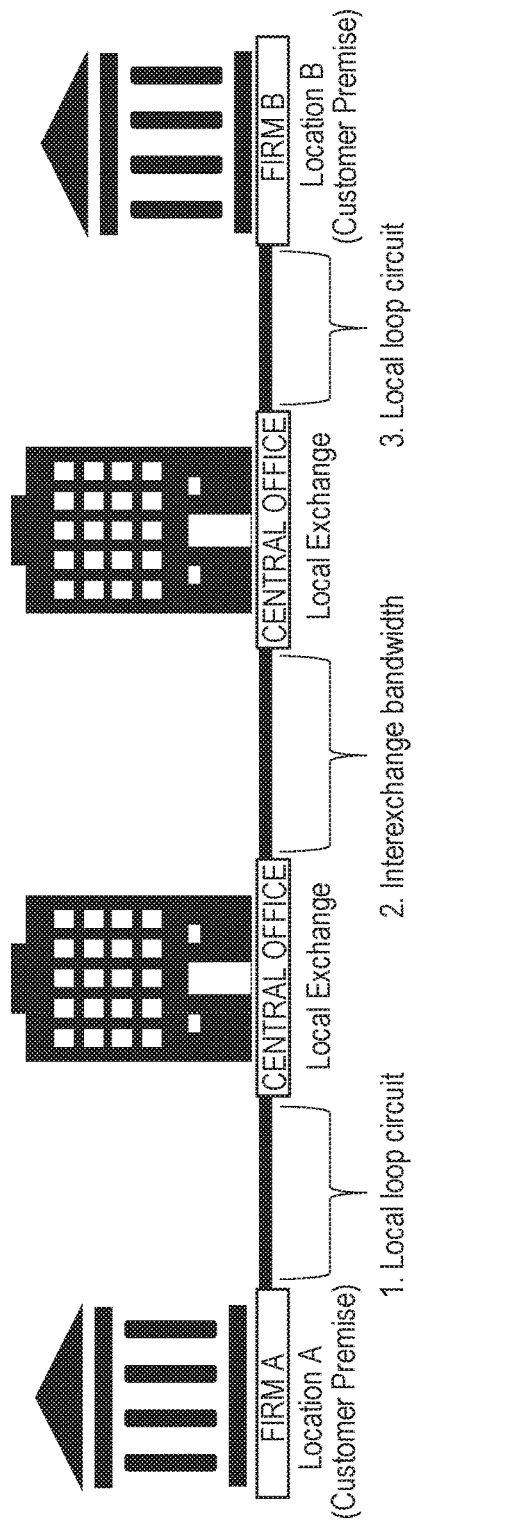
FIG. 6 illustrates the three network components that are required to provision a conventional point to point private line connection.
Figure 7:
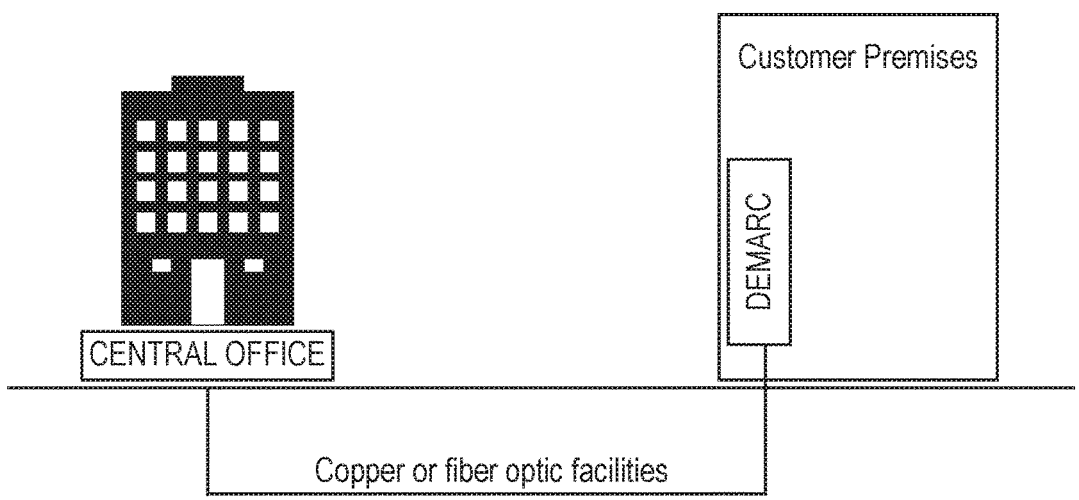
FIG. 7 illustrates the interface between the network carrier demarcation point and customer premises interfaces.
Figure 8:
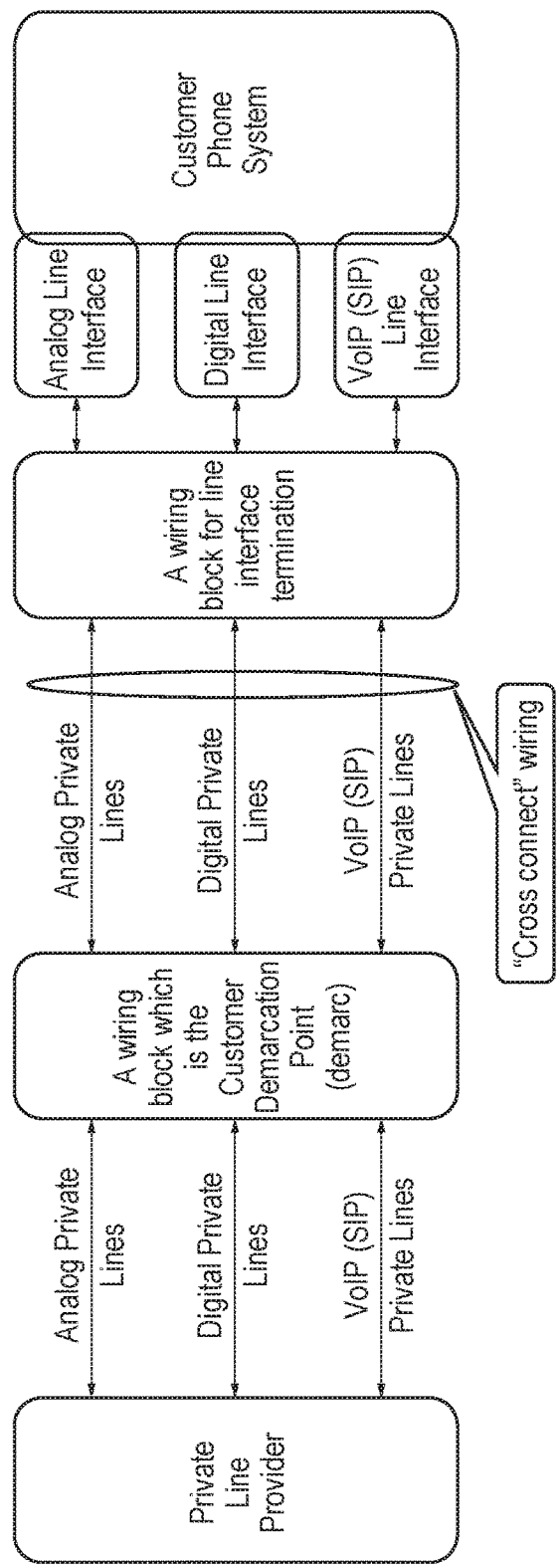
FIG. 8 illustrates the cross connect wiring requirements for analog, digital and VoIP private lines to be connected between network carrier and customer provided telephone system.
Figure 9:
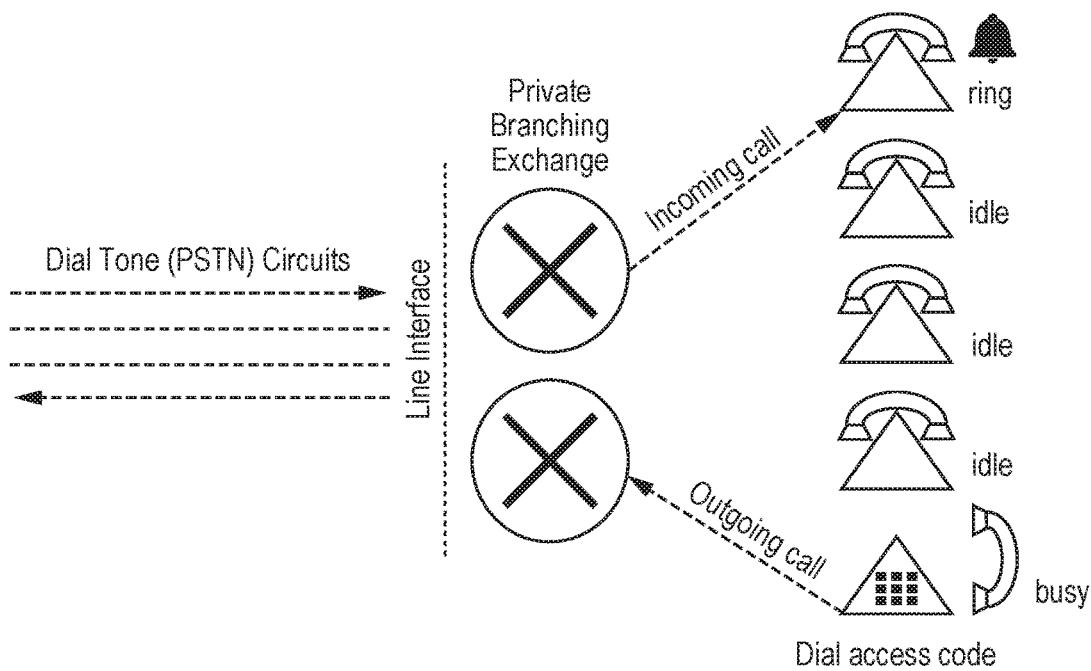
FIG. 9 illustrates an overview of generic PBX system call routing features.
Figure 10:
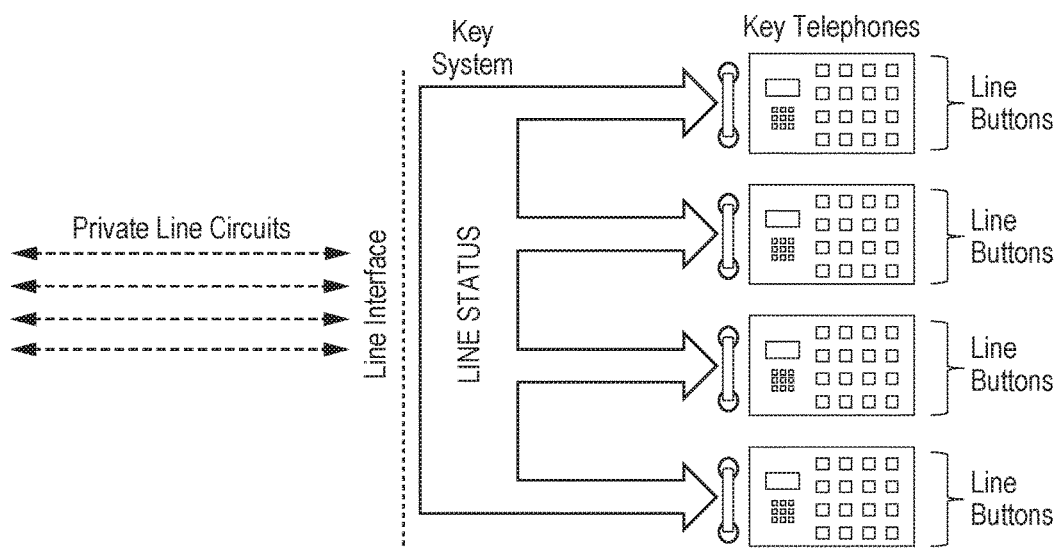
FIG. 10 illustrates the interface and display of private line circuits as button appearances on conventional key telephones.

The invention will next be described in connection with certain illustrated embodiments and practices. However, it will be clear to those skilled in the art that various modifications, additions, and subtractions can be made without departing from the spirit or scope of the claims.

DETAILED DESCRIPTION OF THE TECHNOLOGY

Referring to the figures in detail wherein like reference numerals identify like elements throughout the various figures, there is illustrated in FIGS. 11-16 systems and methods for identifying users of a private line and configuring a separate communication path between a subset of the users. The following description will be limited to the financial industry and in particular trading desks at financial institutions. However, those skilled in the art will recognize that the system could be employed by any groups of people.

Figure 11:
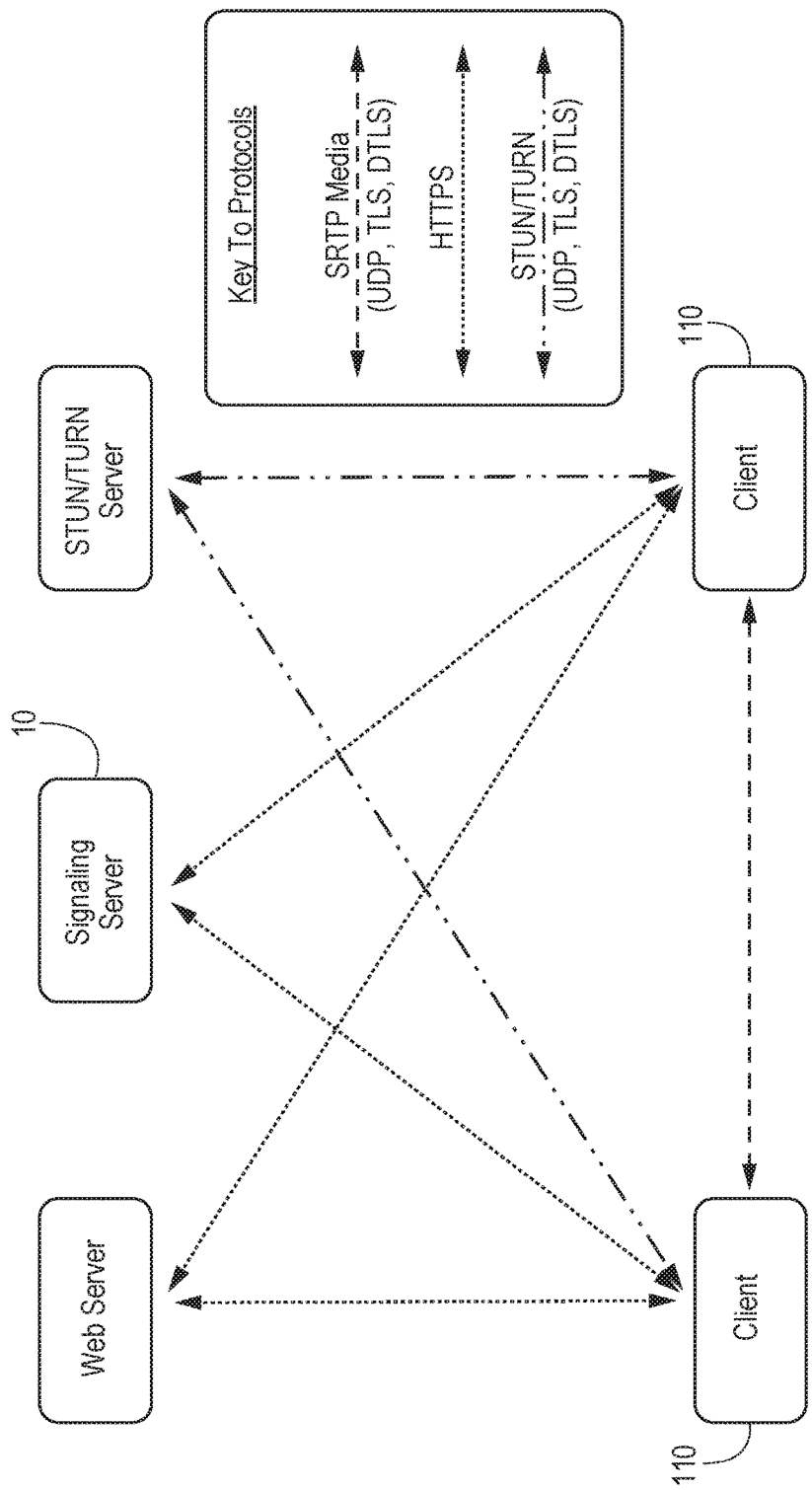
FIG. 11 illustrates a private voice connection configured over a packet switched network.
Figure 12:
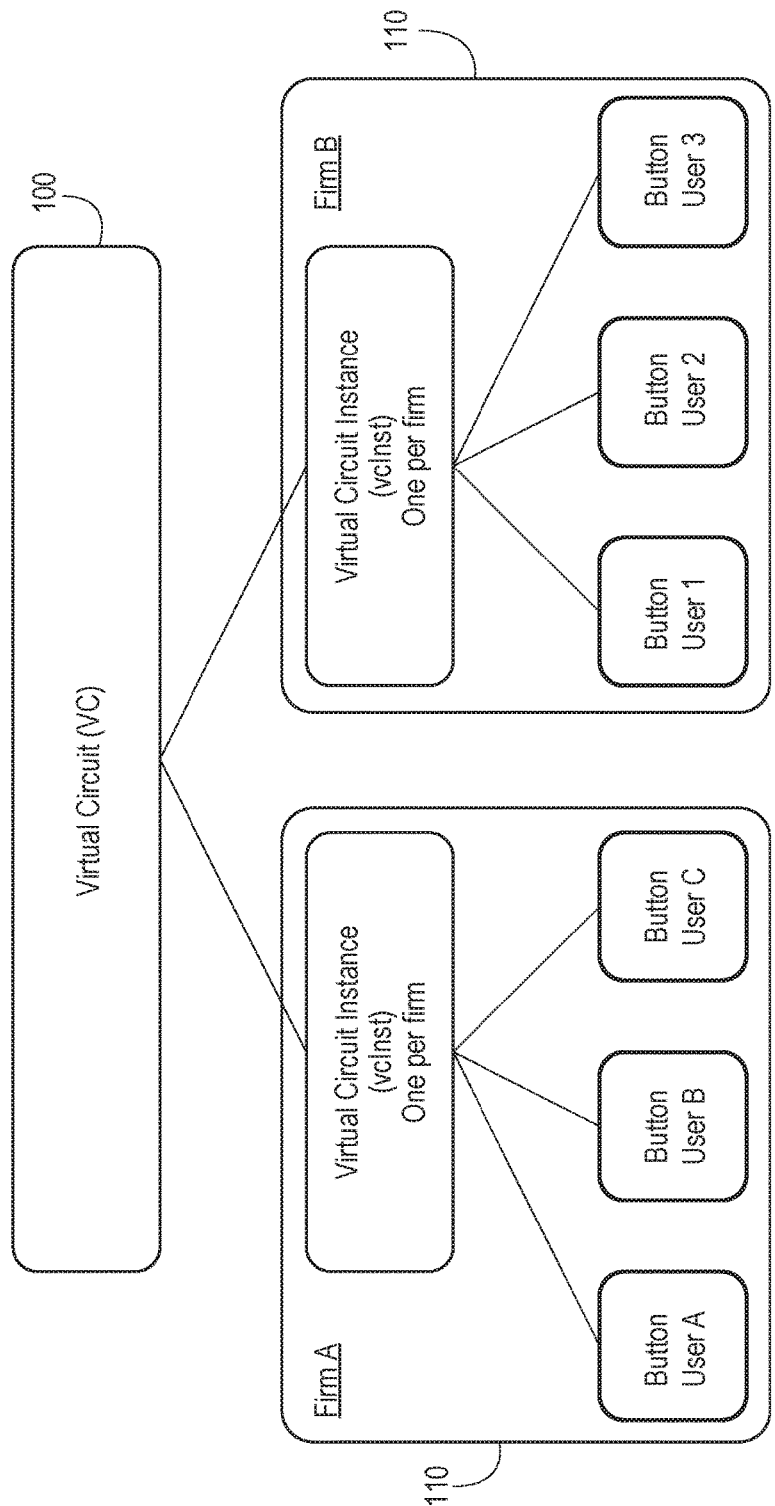
FIG. 12 illustrates a virtual private line circuit between two firms over a packet switched network.
Figure 13:
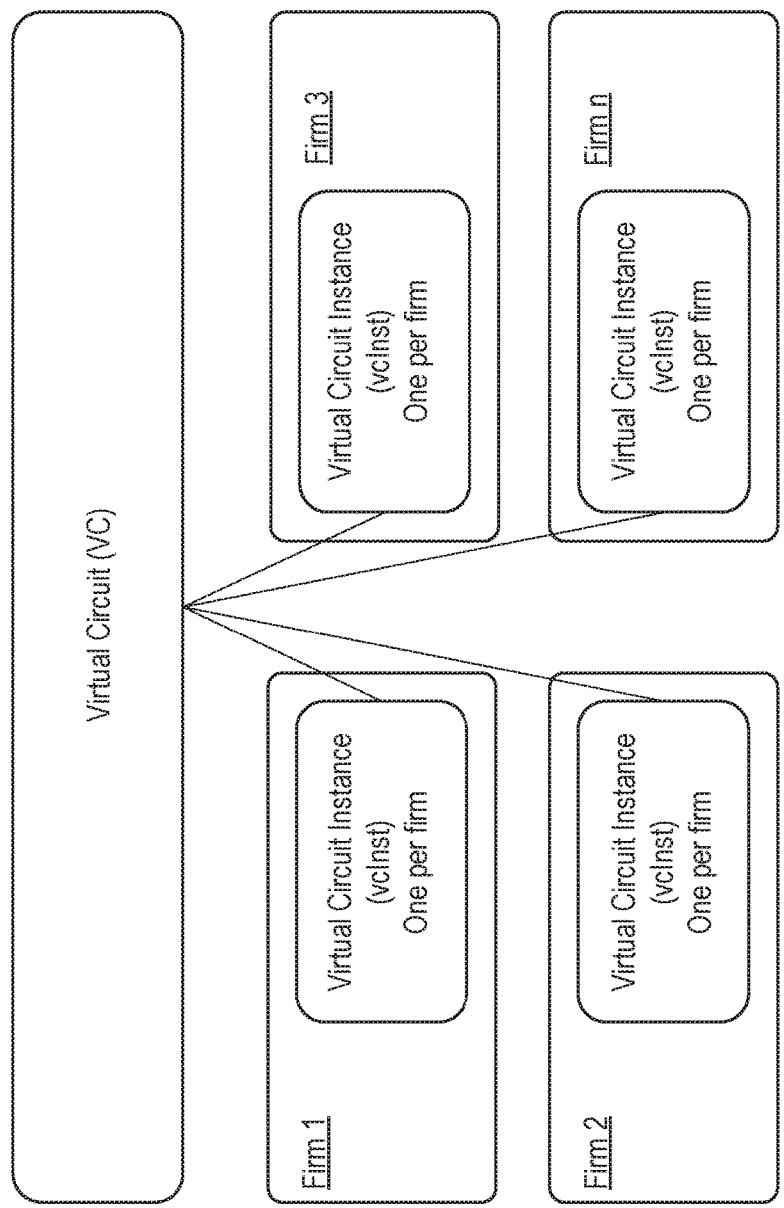
FIG. 13 illustrates a virtual private line circuit between 3 or more firms over a packet switched network.

FIGS. 11-13 illustrate an overview of the connectivity and protocols for setting up a private line over a packet switched network. The Simple Traversal of User Datagram Protocol (UDP)/Traversal Using Relays around Network Address Translators (NAT)(STUN/TURN) server is used for NAT traversal in Voice over Internet Protocol (VoIP). Whether a user is at home behind a common router, at work behind an enterprise firewall, or traveling, chances are that they will be behind a NAT which must be traversed before making VoIP calls. A STUN/TURN server will help an SIP phone automatically punch holes in the NAT. As a solution of last resort, it may simply act as a relay between users when end-to-end connectivity isn't possible.

Figure 14:
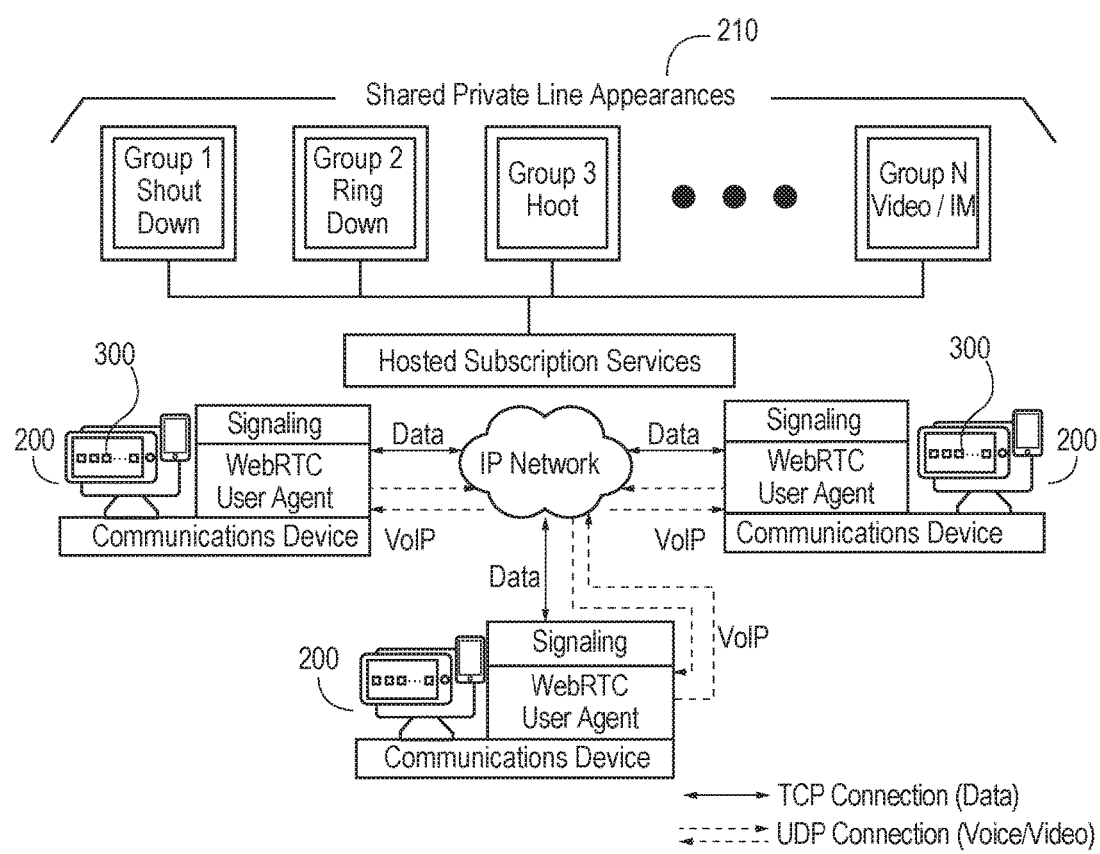
FIG. 14 illustrates a user station connected to a virtual private line circuit and an illustration of a graphical user interface thereon.

As illustrated in FIGS. 12 and 13, the signaling server 10 (FIG. 11) creates a virtual circuit 100 between various users 110. The virtual circuit 100 may be a permanent virtual circuit or a switched virtual circuit. For private line connections it is preferable to employ permanent virtual circuit connections, although since the connection between the parties never really terminates, a switched or dynamic virtual connection may work sufficiently well. A voice engine and signaling system is used to provide these virtual connections. The signaling system provides a communication path between one or more users to signal their status, the fact that they want to communicate, connection information such as desired media to communicate with, contact information for media such as IP address (usually with the aid of STUN/TURN), media encryption information such as encryption keys, and their presence information, and in general any other information that may be needed for a connection. The voice engine provides the interface to sound systems such as sound cards all the way to the network where the VoIP packets are transmitted to the far end. Some components of the voice engine include voice encoding/decoding using the desired voice CODEC, acoustic treatments (noise reduction, echo cancellation, etc), packet management (jitter buffering, timing, etc), and network interfacing. While only one virtual circuit connection is required between two firms, it is possible to have multiple virtual circuits available for redundancy purposes with an automatic roll over feature in the unlikely event that the virtual circuit fails. When a private line connection is set up, only certain users at each firm will be assigned/receive access rights/privileges to connect to the private line connection. In the financial industry this is an important aspect due to regulatory requirements, however it is not necessarily a requirement of the technology. In other words, while not preferred, in one or more configurations access may be provided to anyone within the firm or to diverse groups within the firm and still fall within a scope of one or more claims. When a user accesses/accepts access to the private line connection (e.g. through a computer terminal 200 as illustrated in FIG. 14), this acceptance is stored in a permanent data store typically a database. The acceptance to connect to a particular connection is then user to register with the signaling server for that particular connection. All user that are registered for a particular connection can then communicate via the signaling channel to discover their respective IP addresses with the aid STUN/TURN servers, to notify each other that they want to speak, to let each other know they are present to be spoken to, and other information can be exchanged via this signaling channel such a media type to use for communication (voice, video, IM), finally other enhanced information such as enhanced presence can also be transmitted via this signaling channel.

Figure 15:
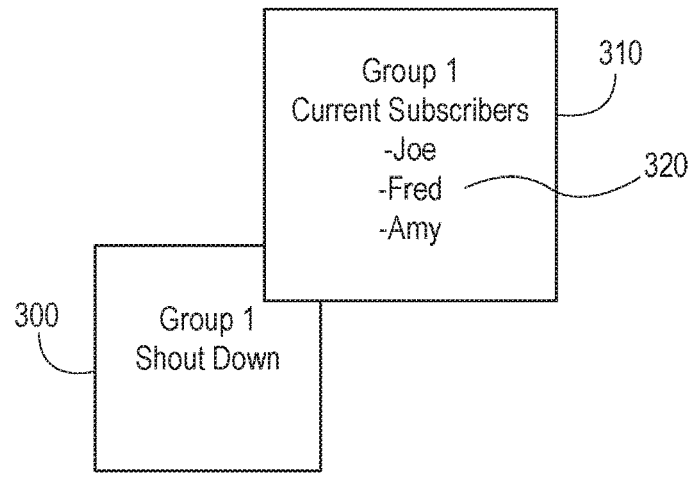
FIG. 15 illustrates identifying members of a virtual private connection in accordance with one or more aspects of the invention; and, FIG. 16 illustrates connecting to one or more members of the virtual private connection via a separate connection from the virtual private connection in accordance with one or more aspects of the invention.
Figure 16:
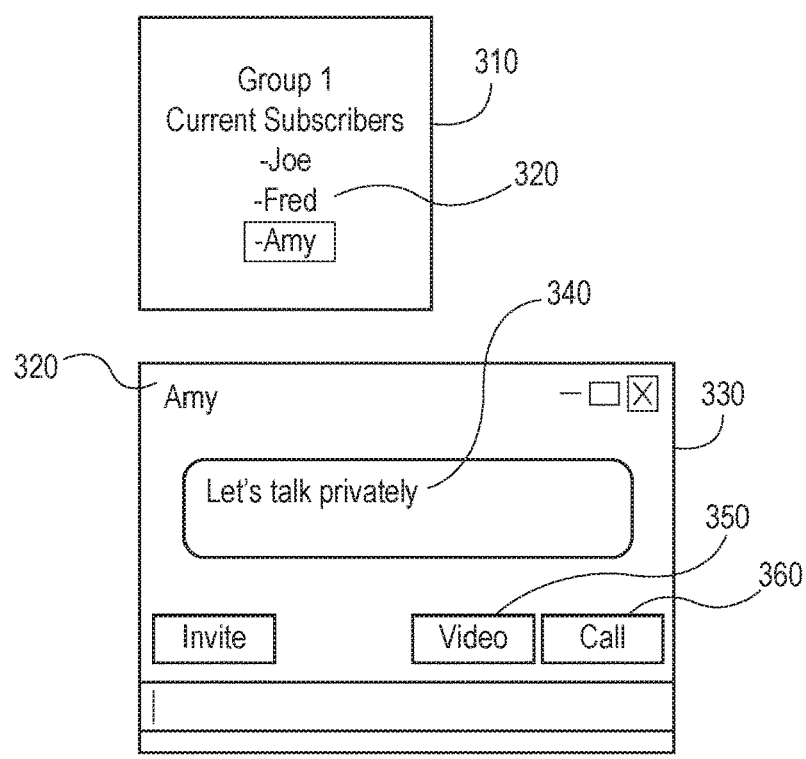

As illustrated in FIG. 14, a user may have access to one or to multiple private line connections 210. Each may be identified on a display as a separate box or as a line in a chart or in any other way that enables the user to differentiate between/among the private line connections with which the user is associated. When the user selects (e.g. right clicks on) one of the private line connections 300, a list 310 of the existing subscribers to that private line connection will be presented to the user (FIG. 15). The list will be generated from users that have presently registered for that connection on the signaling server. While FIG. 15 illustrates a separate pop-up box 310, and requires a right-click to open the pop-up box 310, those skilled in the art will recognize that the technology is not so limited. For example, the system may be configured with a drop-down menu or a radio box or a button or the top level identifier may include the list of subscribers, etc. and still fall within a scope of one or more of the claims herein. Instead of a right click, the mechanism for opening the list of users could be initiated rolling the cursor over the line identifier, by holding the cursor over the line identifier for a predetermined duration of time, or by any other conventional method for initiating such an action. Additionally, while the subscribers are listed individually, they may also or alternatively be listed in groups.

Once the user has access to the list of subscribers 310, the user may select one or more of the subscribers 320 for a separate conversation. Once again this may be done using a right-click or it may be done using a left click or it may be done with a radio box or a button or virtually any other conventional method of selecting an element on a display. Additionally, the user may be provided with the option of selecting multiple subscribers either using the control button with a right or left click or the shift button with a right or left click or the control or shift buttons with an arrow button or again using virtually any other conventional method of selecting multiple elements on a display. Once the user selects the subscriber(s) 320 another Instant Message (IM) window 330 opens (FIG. 16) in which the user may begin an IM conversation with the selected subscriber(s) 320. Those skilled in the art will recognize that while preferred, it need not be a new window, but it could instead simply replace the original window. Further, those skilled in the art will recognize that while IM is the default communication method described, the technology is not so limited. The default may be any form of communication (e.g. voice, video, screen sharing, application sharing, file sharing, etc.) or the user may be provided a choice of which type of communication to initiate and such a configuration will still fall within a scope of one or more claims. Since the system is already aware that the subscribers are connected and is aware of the address of each subscriber there is no need, although it is not prohibited, that the system determine that the subscriber is connected to the system before sending the message/initiating the communication 340. The remaining operation of the IM (or other form of communication) is the same as any conventional IM (or other form of communication) and thus need not be further discussed herein. As with any other IM system or other communication system, the present system may allow a participant to the conversation to add additional subscribers and/or it may provide one or more participants the ability to limit other participants' rights in this regard. Additionally, the users may convert the communication from its original form to another form by selecting the appropriate option 350, 360. When the communication is completed, the participants merely close the new window 330 and the separate connection is terminated, but the private line connection remains available.

Having thus described preferred embodiments of the invention, advantages can be appreciated. Variations from the described embodiments exist without departing from the scope of the invention. Thus it is seen that systems and methods are provided for creating a separate communication channel for two or more subscribers to a private line connection. Although particular embodiments have been disclosed herein in detail, this has been done for purposes of illustration only, and is not intended to be limiting with respect to the scope of the claims, which follow. In particular, it is contemplated by the inventors that various substitutions, alterations, and modifications may be made without departing from the spirit and scope of the invention as defined by the claims. Other aspects, advantages, and modifications are considered to be within the scope of the following claims. The claims presented are representative of the inventions disclosed herein. Other, unclaimed inventions are also contemplated. The inventors reserve the right to pursue such inventions in later claims.

Insofar as embodiments of the invention described above are implemented, at least in part, using a computer system, it will be appreciated that a computer program for implementing at least part of the described methods and/or the described systems is envisaged as an aspect of the invention.

The computer system may be any suitable apparatus, system or device, electronic, optical, or a combination thereof. For example, the computer system may be a programmable data processing apparatus, a computer, a Digital Signal Processor, an optical computer or a microprocessor. The computer program may be embodied as source code and undergo compilation for implementation on a computer, or may be embodied as object code, for example.

It is accordingly intended that all matter contained in the above description or shown in the accompanying drawings be interpreted as illustrative rather than in a limiting sense. It is also to be understood that the following claims are intended to cover all of the generic and specific features of the invention as described herein, and all statements of the scope of the invention which, as a matter of language, might be said to fall there between.

Having described the invention, what is claimed as new and secured by Letters Patent is:

1. A method for providing, between at least three user connections of a private line connection which has been configured over a packet switched network, an alternate communication channel for two of the user connections, the method comprising:
    a processor based device associated with one of the two user connections identifying said at least three of the user connections who have selected the private line connection;
    said processor based device displaying the other of the two user connections on a display associated with said processor based device;
    said processor based device receiving a selection of the other of the two user connections; and,
    said processor based device accessing a network address of the other of the two user connections and setting up an alternate communication channel between the two user connections while maintaining the private line connection.

2. The method according to claim 1 wherein said alternate communication channel is a communication channel other than said private line connection.

3. The method according to claim 1 wherein said alternate communication channel includes an instant messaging channel.

4. The method according to claim 1 wherein said alternate communication channel includes a voice channel.

5. The method according to claim 1 wherein said alternate communication channel includes a video channel.

6. The method according to claim 1 further including said processor based device converting said alternate communication channel from one type of communication channel to another type of communication channel.

7. The method according to claim 1 further including said processor based device displaying a list of all identified user connections on the display associated with the processor based device.

8. The method according to claim 1 further including said processor based device receiving a selection of at least two of said identified users; and said processor based device accessing a network address of said at least two of said identified users and setting up an alternate communication channel between said at least two of said identified users.

9. The method according to claim 1 further including said processor based device receiving a selection of a plurality of said identified users; and said processor based device accessing a network address of said plurality of said identified users and setting up an alternate communication channel among said plurality of said identified users.

10. A method for providing an alternate communication channel to a private line, the method comprising:
    configuring with a server a virtual private line between a plurality of clients via a packet switched network;
    at least three users accessing said virtual private line via a respective computer;
    said server identifying and storing a network address for each computer that accesses said virtual private line; and,
    while said virtual private line is still being accessed by said computers, said server identifying addresses for a group of said computers and configuring an alternate communication channel between said group of said computers; wherein said group of said computers is less than all of said computers.

11. The method according to claim 10 wherein said private line is a permanent virtual circuit.

12. The method according to claim 10 wherein said private line is a switched virtual circuit.

13. The method according to claim 10 further including said server provisioning at least one alternate virtual private line connection via said packet switched network and said server rolling said virtual private line over to said at least one alternate virtual private line connections when the virtual private line connection fails.

14. The method according to claim 10 wherein said alternate communication channel is an instant messaging channel.

15. The method according to claim 10 wherein said alternate communication channel is a voice channel.

16. The method according to claim 10 wherein said alternate communication channel is a video channel.

17. The method according to claim 10 further including said server converting said alternate communication channel from one type of communication channel to another type of communication channel.

18. The method according to claim 10 further including said computers displaying on a display a list of said users who are accessing said virtual private line.

* * * * *